(12) United States Patent
Ulrich (10) Patent No.: US 10,954,004 B2
(45) Date of Patent: Mar. 23, 2021

(54) ENERGY EXTRACTION AND STORAGE, AND PROPULSION SYSTEMS FOR SPACE VEHICLES

(71) Applicant: The Aerospace Corporation, El Segundo, CA (US)

(72) Inventor: Evan R. Ulrich, Manhattan Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 360 days.

(21) Appl. No.: 16/038,142

(22) Filed: Jul. 17, 2018

(65) Prior Publication Data

US 2020/0024002 A1 Jan. 23, 2020

(51) Int. Cl.
*B64G 1/40* (2006.01)
*B64G 1/26* (2006.01)

(52) U.S. Cl.
CPC ...... *B64G 1/40* (2013.01); *B64G 1/26* (2013.01)

(58) Field of Classification Search
CPC . B64G 1/40; B64G 1/26; B64G 1/426; B64G 1/425; B64G 1/407; B64G 2201/167
See application file for complete search history.

(56) References Cited

U.S. PATENT DOCUMENTS

| | | | | |
|---|---|---|---|---|
| 3,145,948 A | * | 8/1964 | Kershner | B64G 1/244 244/168 |
| 5,312,073 A | * | 5/1994 | Flament | B64G 1/44 244/168 |
| 5,921,505 A | * | 7/1999 | Spector | B64G 1/28 244/165 |
| 6,036,143 A | * | 3/2000 | Biber | B64G 1/26 244/169 |
| 2013/0043352 A1 | * | 2/2013 | Bahn | F02K 9/46 244/171.1 |
| 2017/0088291 A1 | * | 3/2017 | Hesse | B64C 29/02 |

* cited by examiner

*Primary Examiner* — Rodney A Bonnette
(74) *Attorney, Agent, or Firm* — LeonardPatel PC (57) ABSTRACT

A space vehicle may extract and store energy, and also include a propulsion system. The space vehicle includes one or more wings connected to a body of the apparatus. Each of the one or more wings includes a propellant system configured to eject mass away from the apparatus, the ejection of the mass causes the apparatus to move from a first position to a second position.

35 Claims, 6 Drawing Sheets

ENERGY EXTRACTION AND STORAGE, AND PROPULSION SYSTEMS FOR SPACE VEHICLES

FIELD

The present invention relates to an energy extraction, storage, and propulsion system, and more particularly, to a system that extracts energy for storage or consumption, and a propulsion system, for space vehicles.

BACKGROUND

Space vehicles include an energy extraction and storage system as well as a propulsions system. For example, small satellite (SAT) propulsion systems use compressed gas or liquid, which is expanded through a nozzle. However, satellites have limited fuel mass stored on board and have limited energy stored within the propellant mass. With these limitations, the satellite has limited station keeping ability. This limitation also reduces the mission life of the satellite.

Further, satellites have an energy extraction and storage system. For example, energy is typically extracted from one or more outside sources, such as solar winds, and subsequently stored in a storage bank or battery for later use. Due to limited storage capacity in the battery, excess energy that is not stored in the battery is left for waste.

Thus, an alternative propulsion system and energy extraction and storage system for space vehicles may be more beneficial.

SUMMARY

Certain embodiments of the present invention may provide solutions to the problems and needs in the art that have not yet been fully identified, appreciated, or solved by current propulsion systems. For example, some embodiments generally pertain to an energy extraction system, an energy storage system, and a propulsion system for space vehicles such as satellites.

In an embodiment, an apparatus includes one or more wings connected to a body of the apparatus. Each of the one or more wings comprises a propellant system configured to eject mass away from the apparatus, the ejection of the mass causes the apparatus to move from a first position to a second position.

In another embodiment, an apparatus includes one or more wings connected to a body of the apparatus. Each of the one or more wings comprises a propellant system configured to eject mass away from the apparatus. The ejection of the mass causes the apparatus to move from a first position to a second position.

In yet another embodiment, the space vehicle includes a plurality of wings with a spin rate of greater than 0, and a body with a spin rate of 0. Each of the plurality of wings include a propellant system located at the tip of each of the plurality of wings. The propellant system is configured to eject mass transferring momentum from the propellant system to the space vehicle, thereby moving from a first position to a second position.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments provide an energy extraction system, an energy storage system, and a propulsion system. For example, energy is extracted from outside sources, and is stored within a space vehicle while in space. In one embodiment, energy is collected and stored in the space vehicle by way of a flywheel. In this example, a charge is collected from a solar cell, and an electric motor is driven using the collected charge to spin the flywheel. It should be noted, however, that other methods may be used to store energy, and the embodiments are not limited to this example.

In certain embodiments, the space vehicle may autorotate by way of drag from the atmosphere (i.e., atmospheric drag pressure), solar winds (i.e., solar wind pressure), or photons from the sun (i.e., light pressure). In these embodiments, the rotational energy extracted from the outside source provides stored energy, which can be used to drive the propulsion system. The propulsion system in some embodiments releases a mass in a direction that would provide propulsive force, bringing the space vehicle to a higher orbit. The propulsive force may be used to move the space vehicle away from a fast approaching object such as a meteoroid.

FIGS. 1A-D are diagrams illustrating a space vehicle 100 with an energy extraction system, an energy storage system, and a propulsion system, according to an embodiment of the present invention. Although a satellite is shown in FIGS. 1A-D representing a space vehicle 100, space vehicle 100 is not limited to a satellite, and may be any one of a large or small satellite, a space vehicle carrying cargo or passenger(s), etc.

In this embodiment, space vehicle 100 is spinning in a first direction $D_1$ at a spin rate $\omega$ greater than 0 ($\omega > 0$). It should be appreciated space vehicle 100 may spin or rotate in the opposite direction. In this example, let's use a 1-meter radius space vehicle 100 with a spin rate $\omega$ of 10 Rad/sec. The tip velocity of space vehicle is 100 meters per second as calculated by Equation (1) below.

$$V = \omega R \qquad \text{Equation (1)}$$

Figure 1A:
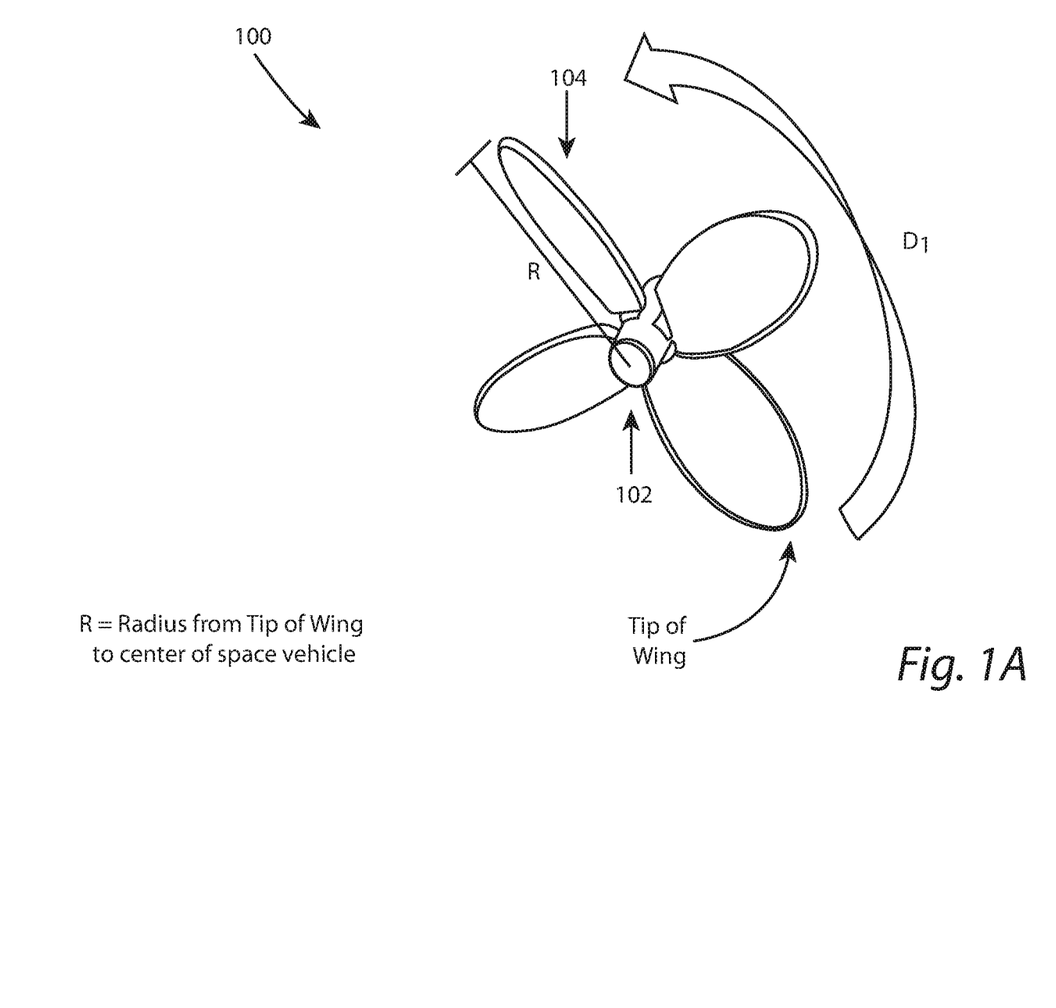
FIGS. 1A-1D are diagrams illustrating a space vehicle with an energy extraction system, an energy storage system, and a propulsion system, according to an embodiment of the present invention.

Continuing with this example, the mass or weight of space vehicle is 1 Kg and the weight of ejected mass (see FIG. 1B) is 0.1 Kg. With this example, a simplified equation for calculating $\Delta V$ may be used.

$$\Delta v = v_{exh} \ln\left(\frac{m_0}{m_1}\right) \qquad \text{Equation (2)}$$

where Δv is a change in velocity such that Δv=v(time 1)−v(time 0), $m_0$ is the initial mass of space vehicle 100 at time=0, $m_1$ is mass of the space vehicle 100 at time=1, ln is the natural log and $v_{exh}$ is the exhaust velocity. In some embodiments, the exhaust velocity is constant.

By using a propulsion system that ejects mass from the tip of space vehicle 100, a larger Δv is possible. This is an improvement over the existing small satellite propulsion systems that have limited Δv capabilities. This improvement is due to utilization of the space environment, as will be discussed in more detail below, by space vehicle 100. Further, since space vehicle 100 does not require chemical reaction or propellant, complications with chemical reaction, as well as propellant handling and storage, are eliminated.

Returning to FIG. 1A, space vehicle 100 may include one or more wings 104. In this embodiment and for purposes of explanation, space vehicle 100 includes four solar wings 104 (hereinafter "wings") extending outward from body 102 of space vehicle 100.

With space vehicle 100, if an object is detected and is moving towards a spinning or rotating space vehicle 100, an impulsive maneuver may be executed. For example, in FIG. 1B, object 108 is moving towards space vehicle 100. As object 108 approaches space vehicle 100, an impulsive maneuver is performed by space vehicle 100. In one embodiment, a mass 106 is released from a tip of one of four wings 104 of space vehicle 100. The release of mass 106 causes space vehicle 100 to move from a first position $P_1$ to a second position $P_2$ and away from moving object 108. The movement is shown more clearly in FIG. 1C.

Figure 1B:
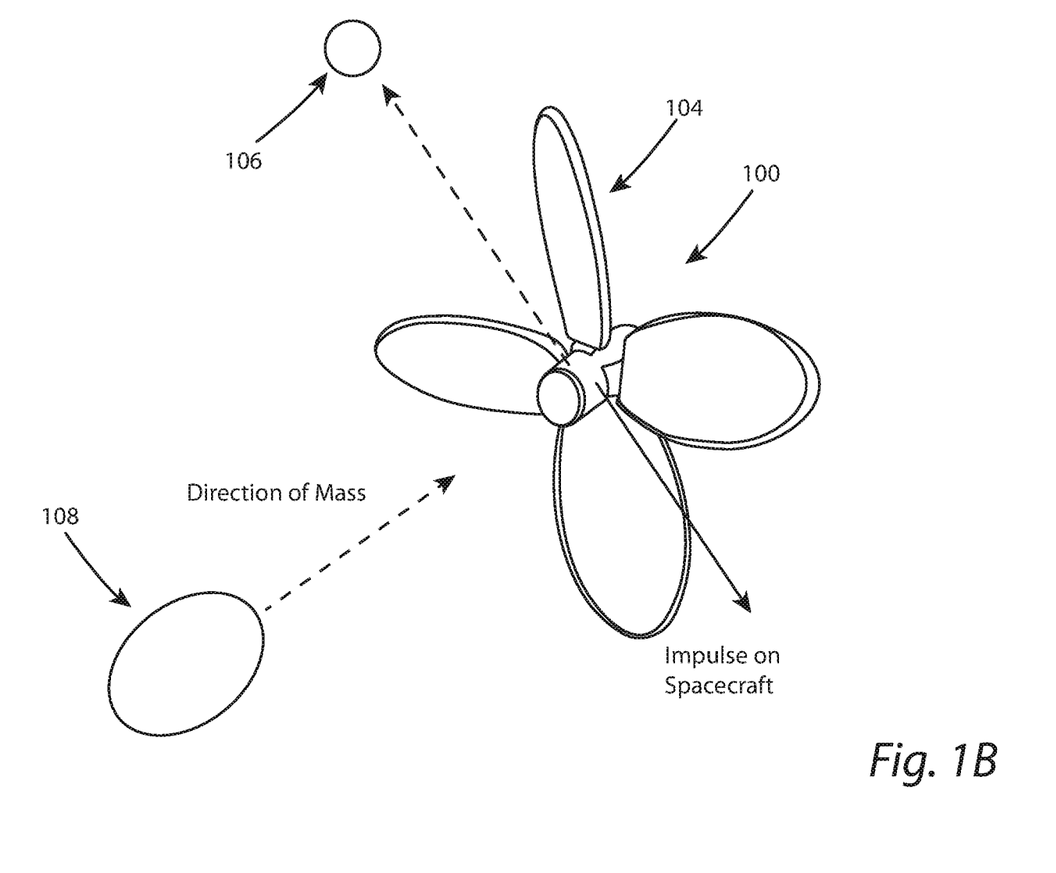
Figure 1C:
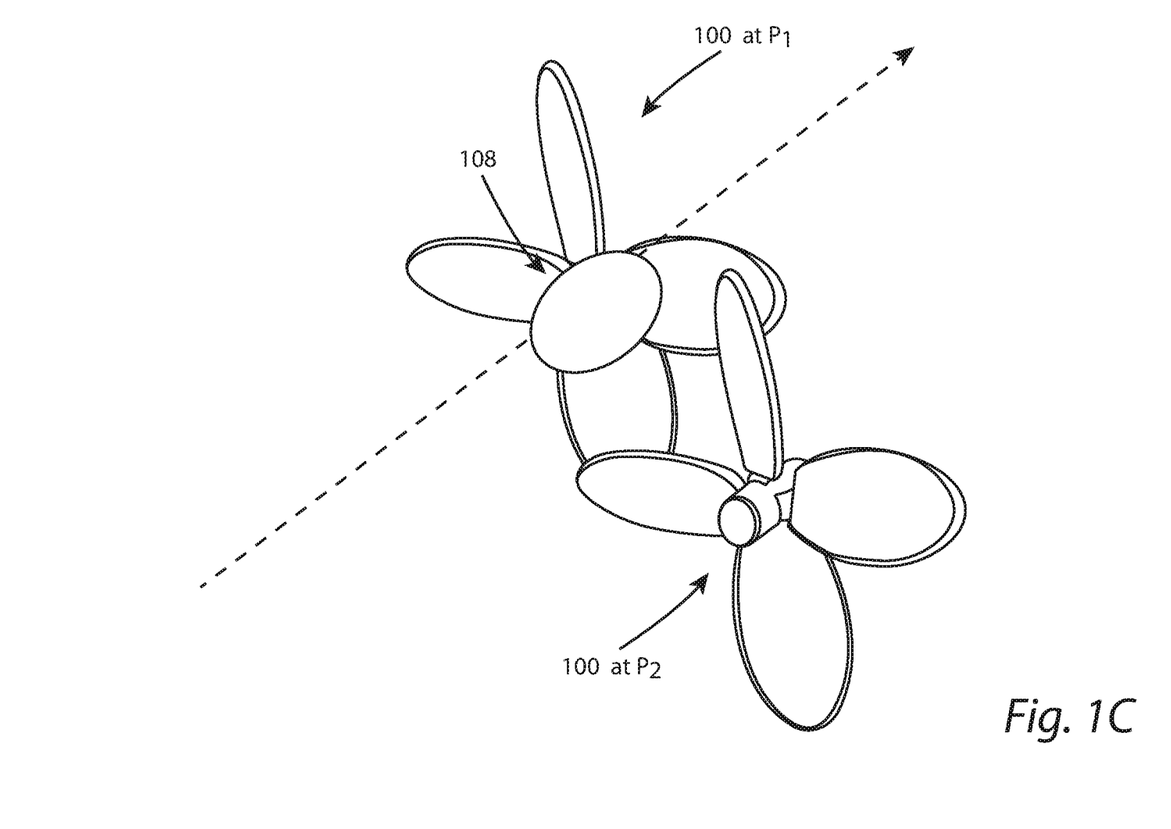

By releasing mass 106, space vehicle 100 becomes imbalanced. To resolve this issue, another mass may be released from a tip of the opposite wings 104. The release of the other mass may provide a balancing of space vehicle 100. It should be noted that the release of mass 100 may create energy that is recaptured by space vehicle 100. A more detailed description is provided below.

Figure 1D:
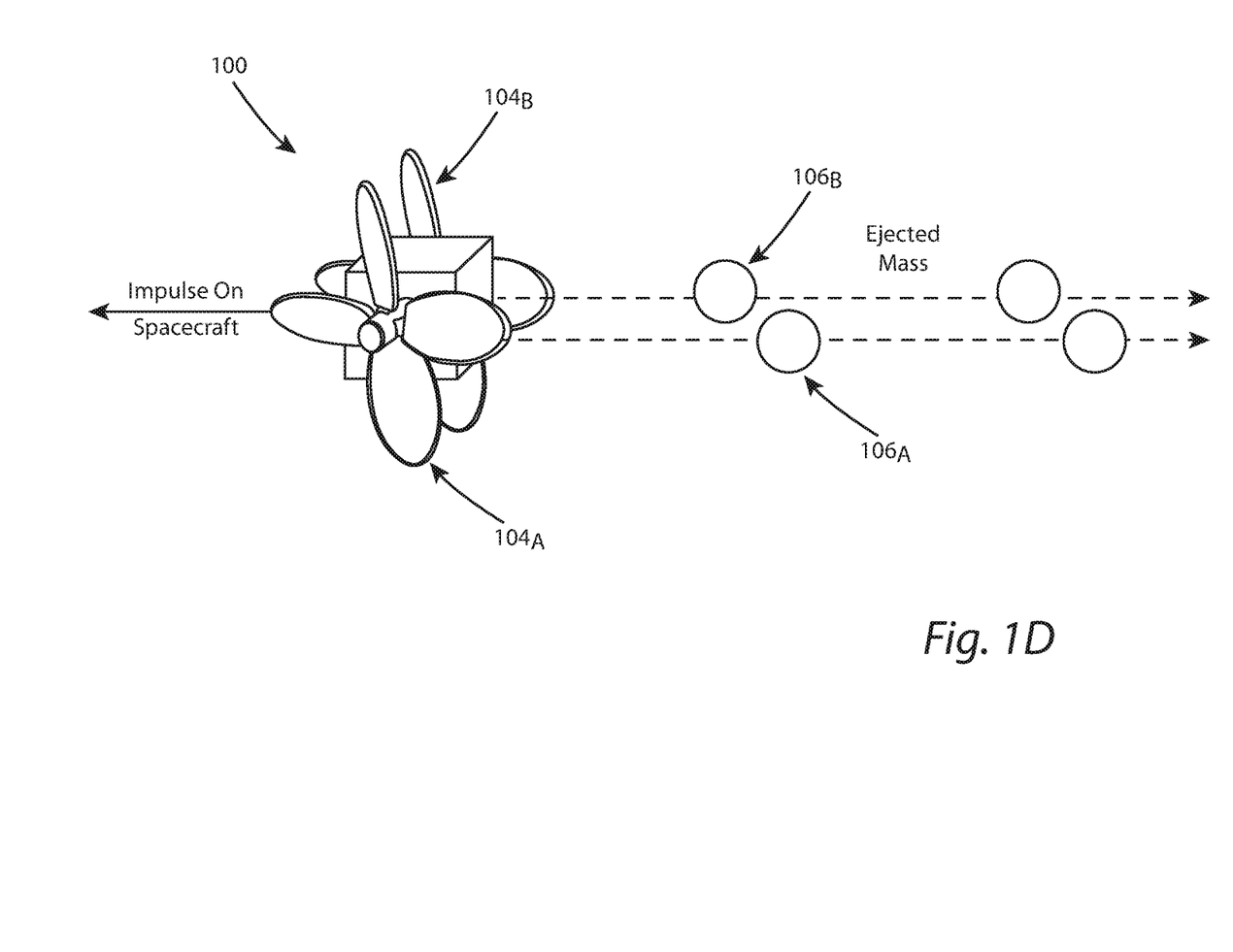
Figure 2:
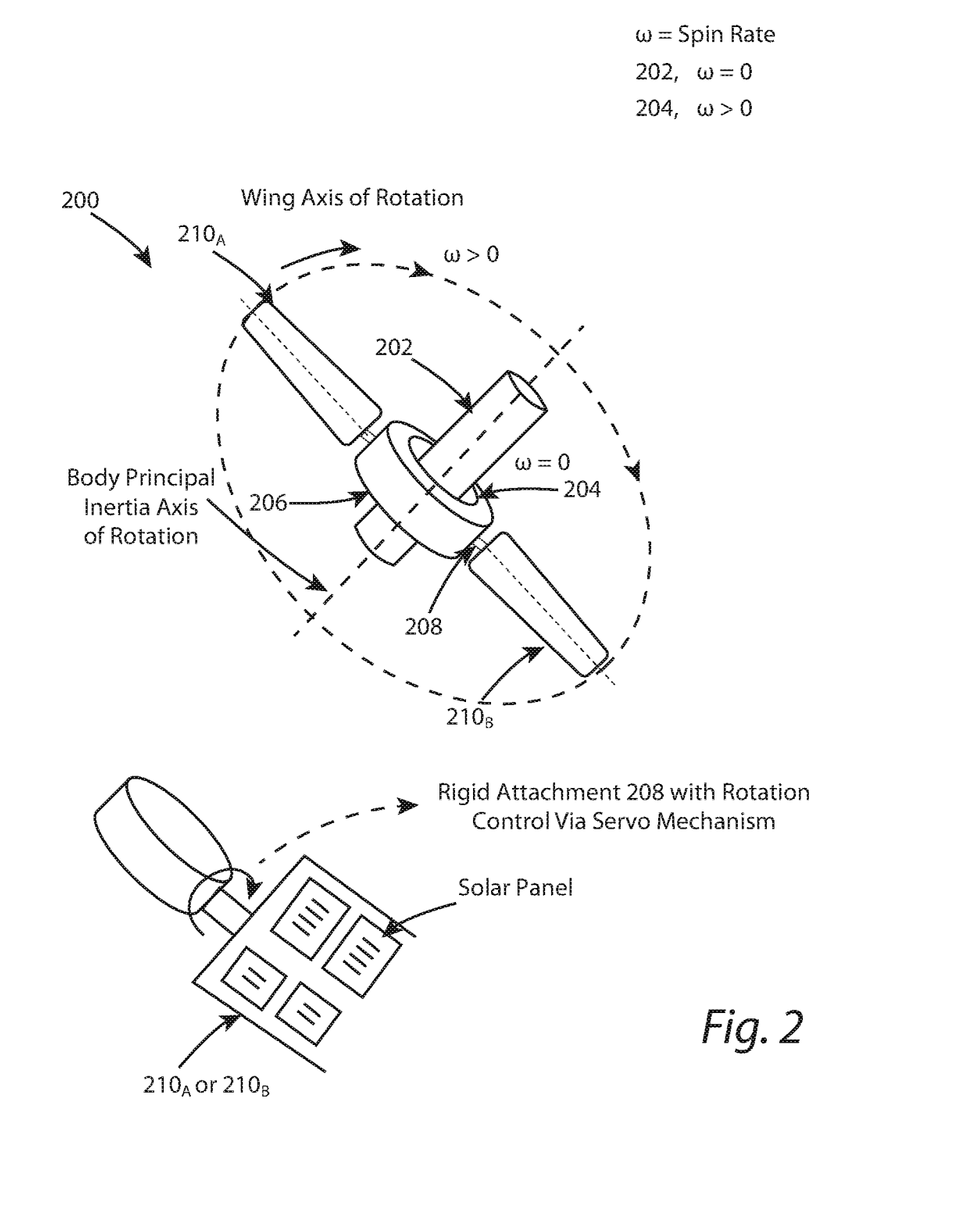
FIG. 2 is a diagram illustrating a space vehicle, according to an embodiment of the present invention.

In certain embodiments, and as shown in FIG. 1D, space vehicle 100 may include a group of wings $104_A$, $104_B$ on each side space vehicle 100. The tip of each wing in the group of wings $104_A$, $104_B$ are configured to release one or more masses, or a pair of masses, $106_A$, $106_B$ in a predetermined direction, causing space vehicle 100 to move in the opposite direction. The momentum transferred to space vehicle 100 from a thruster is equal to the mass of the propellant multiplied by the velocity of the propellant, commonly written as mv. By releasing the same mass from a spinning platform, the momentum transfer is equal to (mv*v)/2, which is a substantial increase in the energy transferred as it is scaled with the square of the velocity FIG. 2 is a diagram illustrating a space vehicle 200, according to an embodiment of the present invention. In some embodiments, the structure of space vehicle 200 may be similar to that of the structure of a space vehicle with solar sails. For example, attached to body (or central member) 202 of space vehicle 200 are wings (or booms) $210_A$, $210_B$, with sails attached thereto. In an embodiment, wings $210_A$, $210_B$ are oriented in the same direction and relative to the direction of motion.

In a typical space vehicle, the wings are mounted at the center of the mass, i.e., along the axis of the area centroid. In this embodiment, however, wings $210_A$, $210_B$ are displaced and angled. The angle of wing $210_A$ or $210_B$ relative to the direction of motion creates a torsional force on wing $210_A$ or $210_B$. This torsional force causes wing $210_A$ or $210_B$ to rotate around space vehicle 200. In one embodiment, a positive angle may result in a positive torque and spin direction. Similarly, a negative angle may cause the opposite force and create a torque and spin in the opposite direction from the first.

Simply put, by angling wings $210_A$, $210_B$, a component of force is added, which is perpendicular to the direction of motion due to the displacement. This displacement causes a torque, which translates into a force, to drive space vehicle 200 to rotate.

In some embodiments, body 202 includes a rotor and space vehicle bus. In this embodiment, stator 204 is located at the center of space vehicle 200 and a housing 206 is on the outside of stator 204 (or space vehicle 200). In some embodiments, spin rate ω of stator 204 is 0 and spin rate ω of housing 206 is greater than 0.

In this embodiment, housing 206 is connected to a plurality of wings $210_A$, $210_B$ by way of a rigid attachment 208 with rotation control. In certain embodiments, rigid attachment 208 may be a servo mechanism. It should be noted that the rotation of housing 206 causes wings $210_A$, $210_B$ to move about space vehicle 200. The spinning of wings $210_A$, $210_B$ about space vehicle 200 causes energy to be spent or pulled.

Rigid attachment 208 in some embodiments may allow solar wings $210_A$, $210_B$ to rotate. In some embodiments, wings $210_A$, $210_B$ rotate about an axis defined by rotor and space vehicle bus 202. Keeping this in mind, rotor and space vehicle bus 202 and stator 204 and housing 206 share a rotational axis. This may be similar to the way a motor and stator share the same axis, allowing each other to freely move in that plane. Stator 204 and housing 206 may be fixed in orientation and coincide with the direction of orbit. Further, stator 204 and housing 206 may rotate about a defined axis, while rotor and space vehicle bus 202 are fixed in terms of a coordinate system, i.e., center mass of coordinate system.

Energy Extraction

To extract energy, the motor (not shown) is despun and energy from the despinning is stored in the battery. In some embodiments, energy is stored by driving the motor to rotate the wing/motor section when excess power is available either through solar or other means. This is useful when the battery charge is at a maximum, but energy is still being produced. This essentially stores the energy in a fly-wheel, which can be slowed and used as an electric generator.

Energy extraction may also occur when space vehicle 200 is deorbiting and is in the presence of atmospheric drag. In this case, the energy from the drag is used to drive rotation of solar wings $210_A$, $210_B$. The rotation that occurs is similar to autorotation described above.

In some embodiments, the atmospheric drag, solar light pressure, or solar wind is applied to the surface area of the solar wings. In these embodiments, the nose of the space vehicle may be pointed in the direction of the wind source. By maintaining the nose of space vehicle pointed at the maximum angle of incidence, the most rotation is produced.

In certain embodiments, to capture energy, forces (e.g., photons and solar wind) from the sun are applied to the surface area of solar wings $210_A$, $210_B$. To capture energy in an atmospheric drag environment, the surface area of solar wings $210_A$, $210_B$ are normal to the direction of motion. In other words, in an atmospheric drag environment, space vehicle 200 spins about an axis in a direction of motion.

Wind energy is transferred into rotational kinetic energy, which is then used to charge the battery.

Energy Storage

To extract electrical energy from space vehicle 200, a braking force is applied. For example, a direct current (DC)

motor (not shown) may be spun, thereby generating a current in the opposite direction. Since batteries have limited capacity, excess energy may be used to drive motor. For example, when the battery is full, the excess energy from space vehicle 200 is used to drive the motor. When the battery is not full, the excess energy is stored within the battery of space vehicle 200.

Propulsion System

In some embodiments, space vehicle 200 may be despun. For example, space vehicle 200 may be despun when additional power is needed to drive the electronics onboard space vehicle 200. In another example, despinning occurs when mass is ejected for an alternative means of propulsion.

In certain embodiments, one or more masses may be stored on the tip of solar wings $210_A$, $210_B$. The one or more masses are stored at the tips, because there is a higher velocity at the tips of solar wings $210_A$, $210_B$ as compared to center of space vehicle 200. It should be appreciated that the rotation rate w is constant on arm of solar wings $210_A$, $210_B$ and velocity depends on the location of the arm of solar wings $210_A$, $210_B$.

When a mass is released, then in no more than a rotation or two, another mass should be released on the opposite side to stabilize the space vehicle. In other words, the second release is a restoring force.

Figure 3A:
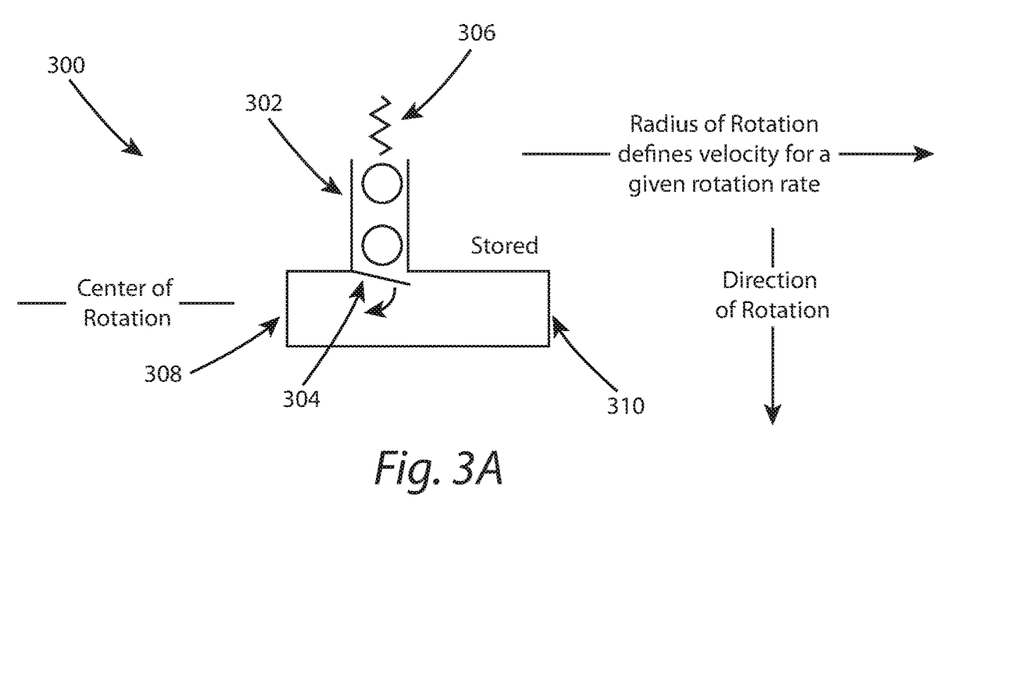
FIGS. 3A and 3B are diagrams illustrating a propulsion system for the space vehicle, according to an embodiment of the present invention.
Figure 3B:
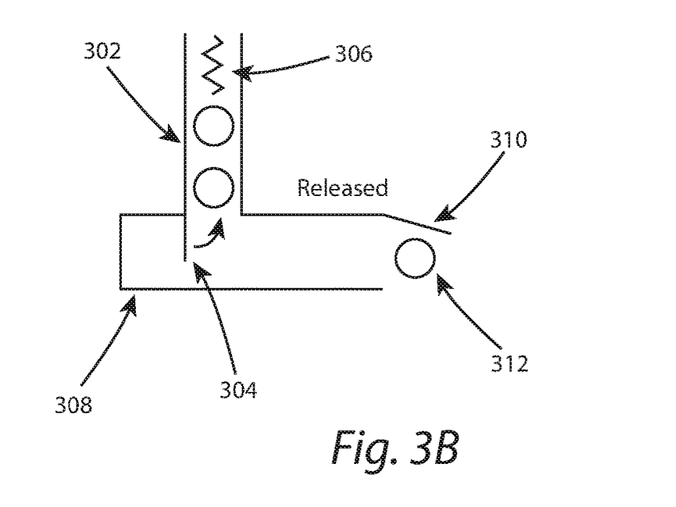

FIGS. 3A and 3B are diagrams illustrating a mass ejection unit 300 for storing and release mass 312 from the tip of a space vehicle, according to an embodiment of the present invention. In this embodiment, a mass ejection unit 300 includes a storage chamber 302 for storing mass 312. Depending on the embodiment, mass 312 may vary in size. In some embodiment, mass 312, while in storage chamber 312, may rest against spring 306. Prior to ejection, spring 306 is in a compressed state.

To launch mass 312 at high speeds, a door 304 opens, causing the state of spring 306 to change from a compressed state to a released state. See FIG. 3B. After releasing mass 312 into launching chamber 308, the state of spring 306 is changed from a release state to a compressed state, and door 304 is closed preventing further masses from entering launching chamber 308.

When mass 312 enters launching chamber 308, a secondary door 310 opens. As secondary door 310 opens, the rotational force from the space vehicle causes mass 312 to be released from launching chamber 308. In other words, the force from rotation causes the mass to be pulled out by centrifugal force.

Certain embodiments may include a mechanism that releases a single ball of mass per 'fire' command. The timing of the release determines the direction of impulse applied to the space vehicle. As discussed above, to balance the resultant imbalance, an identical mass is ejected. The ejection of the identical mass occurs when the wing opposite to the initial wing, which released the mass, is at the same angular position as the first. This secondary ejection causes a rebalance and an impulsive force in the same direction as the first ejection and is useful for orbital maneuvers. Debris can be avoided by releasing masses on opposite sides (180 degrees out of phase). The release of masses causes an impulsive maneuver with the first release, and the second release cause an impulsive maneuver that restores the orbit and rebalances the space vehicle.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. An apparatus, comprising:
one or more wings connected to a body of the apparatus, wherein
each of the one or more wings comprises a propellant system configured to eject mass away from the apparatus, the ejection of the mass causes the apparatus to move from a first position to a second position, and
the one or more wings are displaced and angled, wherein the angle of the one or more wings are relative to a direction of motion creating torsional force on the one or more wings, the torsional force causes the one or more wings to rotate around the apparatus.

2. The apparatus of claim 1, wherein
when the mass is ejected from one wing of the one or more wings, another propellant system on a wing opposite to that of the one wing is configured to eject a mass, the ejection of the mass causes the apparatus to move from the second position back to the first position, thereby stabilizing the apparatus.

3. The apparatus of claim 1, further comprising:
a group of wings on each side of the apparatus, wherein
a tip of each wing in the group of wings comprises a propellant system configured to eject one or more masses, the ejection of the one or more masses causes the apparatus to move in a direct opposite to that of the ejection.

4. The apparatus of claim 1, wherein the propellant system comprises a mass ejection unit configured to store and release mass from a tip of the one or more wings.

5. The apparatus of claim 4, wherein the mass ejection unit comprises a storage chamber configured to store the mass and a launching chamber configured to launch the mass.

6. The apparatus of claim 5, wherein the mass ejection unit comprises a first door configured to open and close, and upon opening of the first door, the mass from the storage chamber moves to the launching chamber via spring within the storage chamber or by way of rotational force exerted from the apparatus.

7. The apparatus of claim 6, wherein the mass ejection unit comprises a second door within the launching chamber configured to open, allowing the mass to be ejected from the apparatus by way of the rotational force from the apparatus.

8. The apparatus of claim 1, wherein the one or more wings are positively angled resulting in a positive torque and spin direction.

9. The apparatus of claim 1, wherein the one or more wings are negatively angled resulting in a negative force, thereby creating torque and spin in a direction opposite to a positive spin direction.

10. The apparatus of claim 1, wherein the body comprises a housing connecting with the one or more wings via a rigid attachment with rotation control.

11. The apparatus of claim 10, wherein when the housing rotates about the apparatus, the one or more wings are configured to move around the body of the apparatus, causing energy to be spent or pulled.

12. The apparatus of claim 10, wherein the rigid attachment is configured to cause the one or more wings to rotate about an axis defined by a rotor and bus of the apparatus.

13. The apparatus of claim 10, wherein the housing and stator are fixed in orientation and coincide with a direction of orbit.

14. The apparatus of claim 13, wherein the housing and stator are configured to rotate about a defined axis while rotor and bus of the apparatus are fixed in terms of a coordinate system.

15. The apparatus of claim 1, further comprising:
a motor configured to be despun, wherein energy extracted from the despinning motor is stored within a battery or is used to drive the one or more wings around the apparatus.

16. The apparatus of claim 1, wherein the one or more wings are rotated around the apparatus when atmospheric drag, solar light pressure, or solar wind is applied to a surface area of the one or more wings and when nose of the apparatus is pointed in a direction of a wind source.

17. A space vehicle, comprising:
a plurality of wings with a spin rate of greater than 0; and
a body with a spin rate of 0, wherein
each of the plurality of wings comprise
a propellant system located at the tip of each of the plurality of wings,
the propellant system is configured to eject mass transferring momentum from the propellant system to the space vehicle, thereby moving from a first position to a second position.

18. The space vehicle of claim 17, wherein
when the mass is ejected from the tip of one of the plurality of wings, mass from a tip on an opposite side to that of the one is ejected, the ejection of the mass causes the space vehicle to move from the second position back to the first position, thereby stabilizing the space vehicle.

19. The space vehicle of claim 17, further comprising:
a group of wings on each side of the space vehicle, wherein
tip of each wing in the group of wings comprises a propellant system configured to eject one or more masses, the ejection of the one or more masses causes the space vehicle to move in a direct opposite to that of the ejection.

20. The space vehicle of claim 17, wherein the propellant system comprises a mass ejection unit configured to store and release mass from a tip of each of the plurality of wings.

21. The space vehicle of claim 20, wherein the mass ejection unit comprises a storage chamber configured to store the mass and a launching chamber configured to launch the mass.

22. The space vehicle of claim 21, wherein the mass ejection unit comprises a first door configured to open and close, and upon opening of the first door, the mass from the storage chamber moves to the launching chamber via spring within the storage chamber or by way of rotational force exerted from the space vehicle.

23. The space vehicle of claim 22, wherein the mass ejection unit comprises a second door within the launching chamber configured to open, causing the mass to be ejected from the space vehicle by way of the rotational force from the space vehicle.

24. The space vehicle of claim 17, wherein each of the plurality of wings are displaced and angled, wherein the angle for each of the plurality of wings are relative to a direction of motion creating torsional force on each of the plurality of wings, the torsional force causes each of the plurality of wings to rotate around the space vehicle.

25. The space vehicle of claim 24, wherein each of the plurality of wings are positively angled resulting in a positive torque and spin direction.

26. The space vehicle of claim 24, wherein each of the plurality of wings are negatively angled resulting in a negative force, thereby creating torque and spin in a direction opposite to a positive spin direction.

27. The space vehicle of claim 17, wherein the body comprises a housing connecting with the plurality of wings via a rigid attachment for rotation control.

28. The space vehicle of claim 27, wherein when the housing rotates about the space vehicle, each of the plurality of wings are configured to move around the body of the space vehicle, causing energy to be spent or pulled.

29. The space vehicle of claim 27, wherein the rigid attachment is configured to cause each of the plurality of wings to rotate about an axis defined by a rotor and bus of the space vehicle.

30. The space vehicle of claim 27, wherein the housing and stator are fixed in orientation and coincide with a direction of orbit.

31. The space vehicle of claim 30, wherein the housing and stator are configured to rotate about a defined axis while rotor and bus of the space vehicle are fixed in terms of a coordinate system.

32. The space vehicle of claim 17, further comprising:
a motor configured to be despun, wherein energy extracted from the despinning motor is stored within a battery or is used to drive the each of the plurality of wings around the space vehicle.

33. The space vehicle of claim 17, wherein each of the plurality of wings are rotated around the space vehicle when atmospheric drag, solar light pressure, or solar wind is applied to a surface area of each of the plurality wings and when nose of the space vehicle is pointed in a direction of a wind source.

34. An apparatus, comprising:
one or more wings connected to a body of the apparatus, wherein
each of the one or more wings comprises a propellant system configured to eject mass away from the apparatus, the ejection of the mass causes the apparatus to move from a first position to a second position, and
the propellant system comprises a mass ejection unit configured to store and release mass from a tip of the one or more wings, the mass ejection unit comprising a first door configured to open and close, and upon opening of the first door, the mass from a storage chamber moves to a launching chamber via spring within the storage chamber or by way of rotational force exerted from the apparatus.

35. An apparatus, comprising:

one or more wings connected to a body of the apparatus, wherein each of the one or more wings comprises a propellant system configured to eject mass away from the apparatus, the ejection of the mass causes the apparatus to move from a first position to a second position; and a motor configured to be despun, wherein energy extracted from the despinning motor is stored within a battery or is used to drive the one or more wings around the apparatus.

* * * * *